United States Patent
Watanabe et al.

(10) Patent No.: US 7,103,199 B2
(45) Date of Patent: Sep. 5, 2006

(54) CHARACTER RECOGNITION METHOD AND APPARATUS

(75) Inventors: Hiroshi Watanabe, Kawasaki (JP); Takafumi Edanami, Kawasaki (JP); Nobuhiro Tsunashima, Kawasaki (JP); Akinori Momii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 10/271,548

(22) Filed: Oct. 17, 2002

(65) Prior Publication Data

US 2003/0156755 A1 Aug. 21, 2003

(30) Foreign Application Priority Data

Feb. 20, 2002 (JP) ............................. 2002-043709

(51) Int. Cl.
*G06K 9/00* (2006.01)
*G06K 9/62* (2006.01)
*G06K 9/40* (2006.01)

(52) U.S. Cl. .................... 382/105; 382/274; 382/216

(58) Field of Classification Search ................ 382/105, 382/102, 274
See application file for complete search history.

(56) References Cited

U.S. PATENT DOCUMENTS

| | | | | |
|---|---|---|---|---|
| 5,425,108 A | * | 6/1995 | Hwang et al. | ............... 382/105 |
| 6,339,651 B1 | * | 1/2002 | Tian et al. | .................. 382/105 |

FOREIGN PATENT DOCUMENTS

| | | | |
|---|---|---|---|
| JP | 8-235493 | | 9/1996 |
| JP | 10-11528 | | 1/1998 |
| JP | 11-175655 | * | 7/1999 |
| JP | 11-201741 | | 7/1999 |
| JP | 2001-60295 | | 3/2001 |
| JP | 2001-188904 | | 7/2001 |

OTHER PUBLICATIONS

Dzuba, Gregory, Filatov, Alexander, Volgunin, Alexander. Handwritten ZIP Code Recognition. IEEE 1997.*

Yung, N.H.C., Au, K.H., Lai, A.H.S. Recognition of Vehicle Regristration Mark on Moving Vehicles in an Outdoor Environment. IEEE 1999.*

* cited by examiner

*Primary Examiner*—Joseph Mancuso
*Assistant Examiner*—Robert Tarcu
(74) *Attorney, Agent, or Firm*—Staas & Halsey LLP

(57) ABSTRACT

A character recognition method is provided, in which the method includes the steps of: picking up images in a motion picture by changing brightness for each image; extracting a character area from each image; recognizing at least one character in the character area by performing a matching process between the character area and dictionary images for each image, and determining a character recognition result for each image; and selecting a final character recognition result of which the matching degree is the highest from the character recognition results of the images. Accordingly, even when a character is too dark to recognize due to shadows in the daytime or a character is too bright to recognize due to irradiation in the nighttime, the character can be recognized by using images having differing brightness.

9 Claims, 7 Drawing Sheets

FIG.2 PRIOR ART (A) 5
[NORMAL]

(B) [5]
[SHADOW OF SURROUNDING OBJECT]

(C) [5]
[IRRADIATION FROM SURROUNDING]

(D) ▢
[OBSTACLE]

FIG.5

| <DAYTIME> | NORMAL IMAGE | ADDITIONAL IMAGE (BRIGHTER THAN NORMAL) |
|---|---|---|
| CHARACTER OF NORMAL STATE | 5 | 5 |
| CHARACTER WHEN SHADOW OCCURS | 5 | 5 |

FIG.6

| <NIGHTTIME> | NORMAL IMAGE | ADDITIONAL IMAGE (DARKER THAN NORMAL) |
|---|---|---|
| CHARACTER OF NORMAL STATE | 5 | 5 |
| CHARACTER WHEN IRRADIATION OCCURS | 5 | 5 |

CHARACTER RECOGNITION METHOD AND APPARATUS

BACKGROUND OF THE INVENTION

1. Field of the Invention

The present invention relates to a character recognition method and apparatus. More particularly, the present invention relates to a character recognition method and apparatus for extracting and recognizing characters in a motion picture.

2. Description of the Related Art

With recent improvements in image processing technology, it has become possible to extract and recognize characters in a motion picture. In addition, a technology has been developed for extracting a character area from a recognition target object that passes through a camera range and recognizing characters in the character area, in which image pickup devices and image processing apparatuses are set up in various locations indoors and/or outdoors.

For example, the character recognition apparatus can be used for a system for recognizing numbers of cars that enter a parking area to manage the cars.

FIG. 1 shows a block diagram of an example of a conventional character recognition apparatus. Each input image from an image pickup apparatus 10 is captured in a processor 20 by an image capturing part 21 every 1/30 second. For the captured image, a target object detection part 22 checks whether a recognition target object, a car, for example, appears. An image from which the recognition target object is detected is passed to a character area extraction processing part 23. The character area extraction processing part 23 extracts a character area (for example, an area of a number plate) from the recognition target object. The character recognition processing part 24 performs a matching process between the extracted character area and dictionary images, so that recognition result is output to the outside, wherein each character is compared with dictionary images to determine if there is a match in the matching process, for example.

Usually, focus and shutter speed of an infrared camera in the image pickup apparatus 10 are adjusted and fixed when the image pickup apparatus 10 is set up. After that, an iris control part 25 in the processor 20 controls, via an image pickup apparatus control part 26, an iris of the infrared camera 11 such that brightness of the character area or brightness of the whole image becomes proper for performing recognition.

However, depending on circumstances determined by location and setting conditions of the image pickup apparatus 10 and by a time period, iris control cannot be performed properly, so that characters in the image cannot be recognized accurately. For example, the iris cannot be controlled to a proper value instantaneously when shadows of surrounding objects during the daytime, irradiation from surrounding objects during the night, obstacles and the like appear.

FIG. 2 shows changes of an image of a character area due to environmental change, in which (A) corresponds to a normal condition, (B) corresponds to a condition in which shadows of surrounding objects occur during the daytime, (C) corresponds to a condition in which irradiation from surrounding objects occurs during the night, and (D) corresponds to a condition in which the character area is hidden by an obstacle. In the conditions shown in (B), (C), and (D), the character in the character area cannot be recognized properly.

SUMMARY OF THE INVENTION

An object of the present invention is to provide a character recognition method and apparatus for picking up an image of a character area properly in various circumstances and for improving performance of character recognition.

The object of the present invention can be achieved by a character recognition method used for extracting a character area from a recognition target object in a motion picture and recognizing a character in the character area, the character recognition method including the steps of:

picking up images in a motion picture by changing brightness for each image;

extracting a character area from each image;

recognizing at least a character in the character area by performing a matching process between the character area and dictionary images for each image, and determining a character recognition result for each image; and selecting a final character recognition result of which the matching degree is the highest from character recognition results of the images.

According to the above-mentioned invention, even when a character is too dark to recognize due to shadows of surrounding objects in the daytime, the character can be recognized by using images having differing brightness. In addition, even when a character is too bright to recognize due to irradiation from surroundings in the nighttime, the character can be recognized by using images having differing brightness. Thus, character recognition performance improves.

BRIEF DESCRIPTION OF THE DRAWINGS

Other objects, features and advantages of the present invention will become more apparent from the following detailed description when read in conjunction with the accompanying drawings, in which:

FIG. 2 shows changes of an image of a character area due to environmental change;

FIG. 5 shows differences of character status between a normal image and an additional image in the daytime;

FIG. 6 shows differences of character status between a normal image and an additional image in the nighttime;

DETAILED DESCRIPTION OF THE PREFERRED EMBODIMENTS

Figure 1:
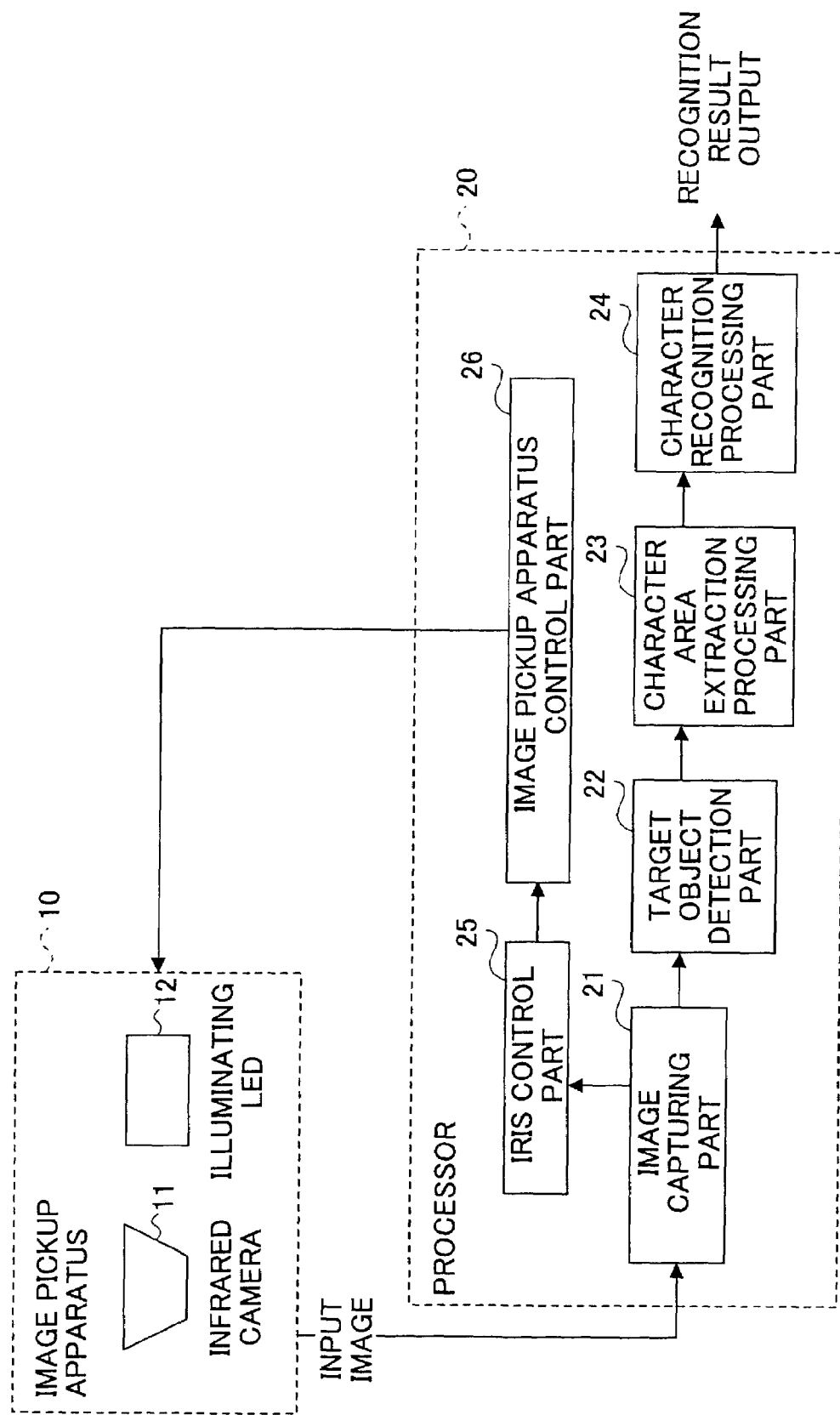
FIG. 1 shows a block diagram of an example of a conventional character recognition apparatus.
Figure 3:
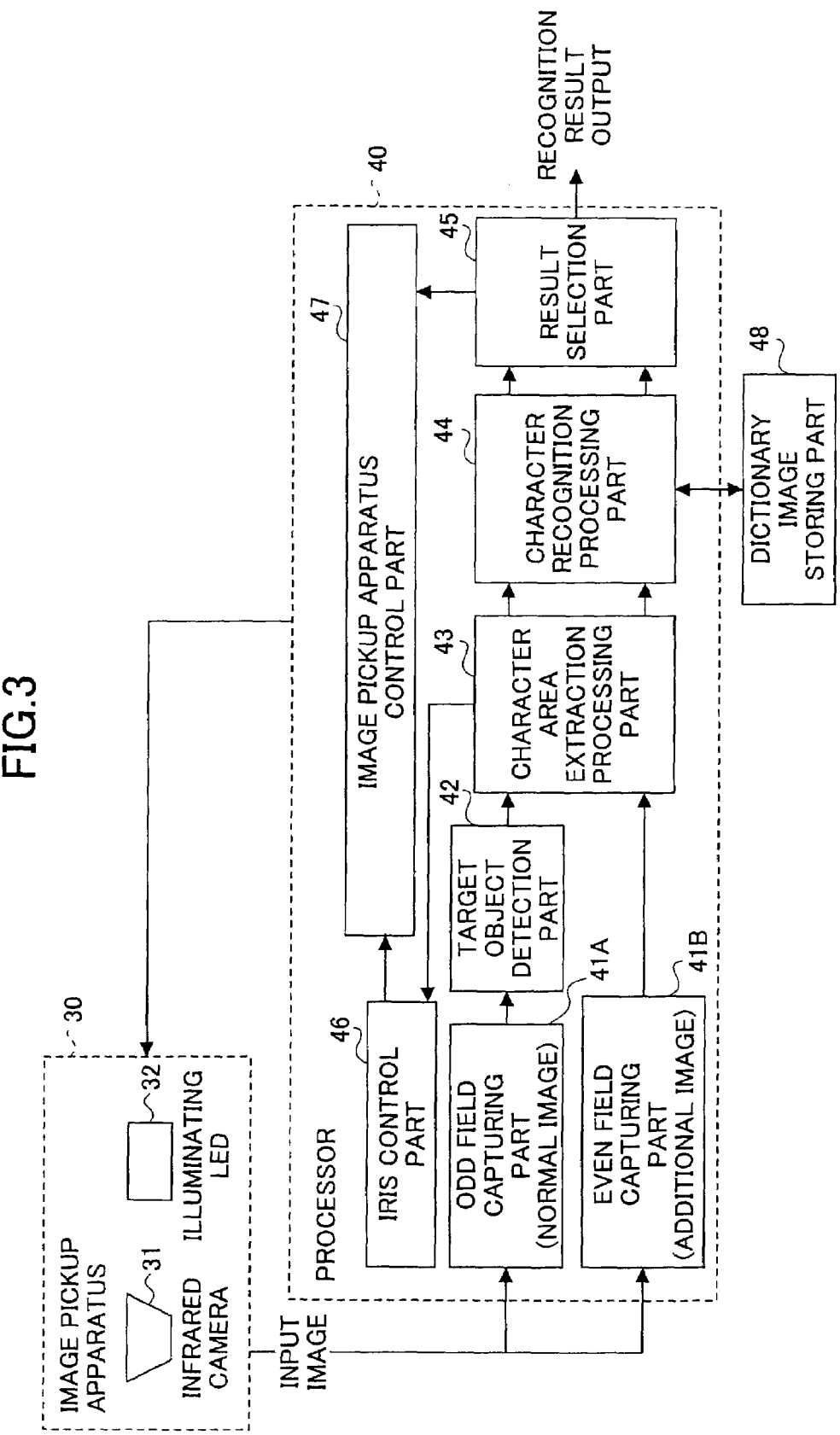
FIG. 3 shows a block diagram of the first embodiment of a character recognition apparatus of the present invention.

FIG. 3 shows a block diagram of the first embodiment of a character recognition apparatus of the present invention. In the figure, an image pickup apparatus 30 includes an infrared camera 31 that can pick up images day and night, and an illuminating LED 32. The infrared camera 31 has a function to use different shutter speeds for each image of an odd field and an even field. The illuminating LED 32 is effective only for images of the odd field.

An odd field capturing part 41A and an even field capturing part 41B in a processor 40 capture the odd field and the even field, respectively almost at the same time, from an input image from the image pickup apparatus 30 every ⅓₀ second. After that, the odd field image is processed as a normal image, and the even field image is processed as an additional image.

An image captured by the odd field capturing part 41A is supplied to a target object detection part 42, in which it is determined whether a recognition target object such as a car exists. An odd field image in which the recognition target object is detected is passed to a character area extraction processing part 43, in which a character area (a number plate, for example) is extracted from the recognition target object. Also, as for the even field image, the recognition target object is regarded to be detected in a position almost the same as that where the recognition target object is detected in the odd field image, and the even field image is passed to the character area extraction processing part 43, and a character area is extracted from the recognition target object.

For example, in the character area extraction processing part 43, an area where the number of edges of perpendicular directions exceeds a threshold is extracted as the character area, wherein an edge is a point where brightness rapidly changes in a monochrome image. This extraction method utilizes a property that the number of edges of perpendicular directions in a character area is greater than that in other areas.

Each character area in the extracted odd field image and even field image is compared with dictionary images in the dictionary image storing part 48 by the character recognition processing part 44 as a matching process, and a character matching with a dictionary image is passed to a result selection part 45. The result selection part 45 selects a character recognition result that matches the dictionary image more accurately between a character recognition result of the odd field and a character recognition result of the even field. In the following, accuracy of matching will be called "matching degree".

Normally, focus and shutter speed of the infrared camera 31 in the image pickup apparatus 30 are adjusted and fixed when the image pickup apparatus 30 is set up. The iris control part 46 in the processor 40 controls the iris of the infrared camera 31 via the image pickup control part 47 such that brightness of the character area to be extracted from a normal image of the odd field (or whole image of the normal image) becomes a proper value.

In addition, on the basis of an iris setting value obtained here, the illuminating LED 32 and shutter speed for an additional image are controlled. When the iris setting value is no less than a predetermined threshold, the apparatus determines that it is daytime, the illuminating LED 32 is turned off, and the shutter speed for the additional image is set to be ½ of that for a normal image or less. When the iris setting value is smaller than the threshold, the apparatus determines that it is night, so that the illuminating LED 32 is turned on and the shutter speed for the additional image is set to be the same as that for the normal image.

Figure 4:
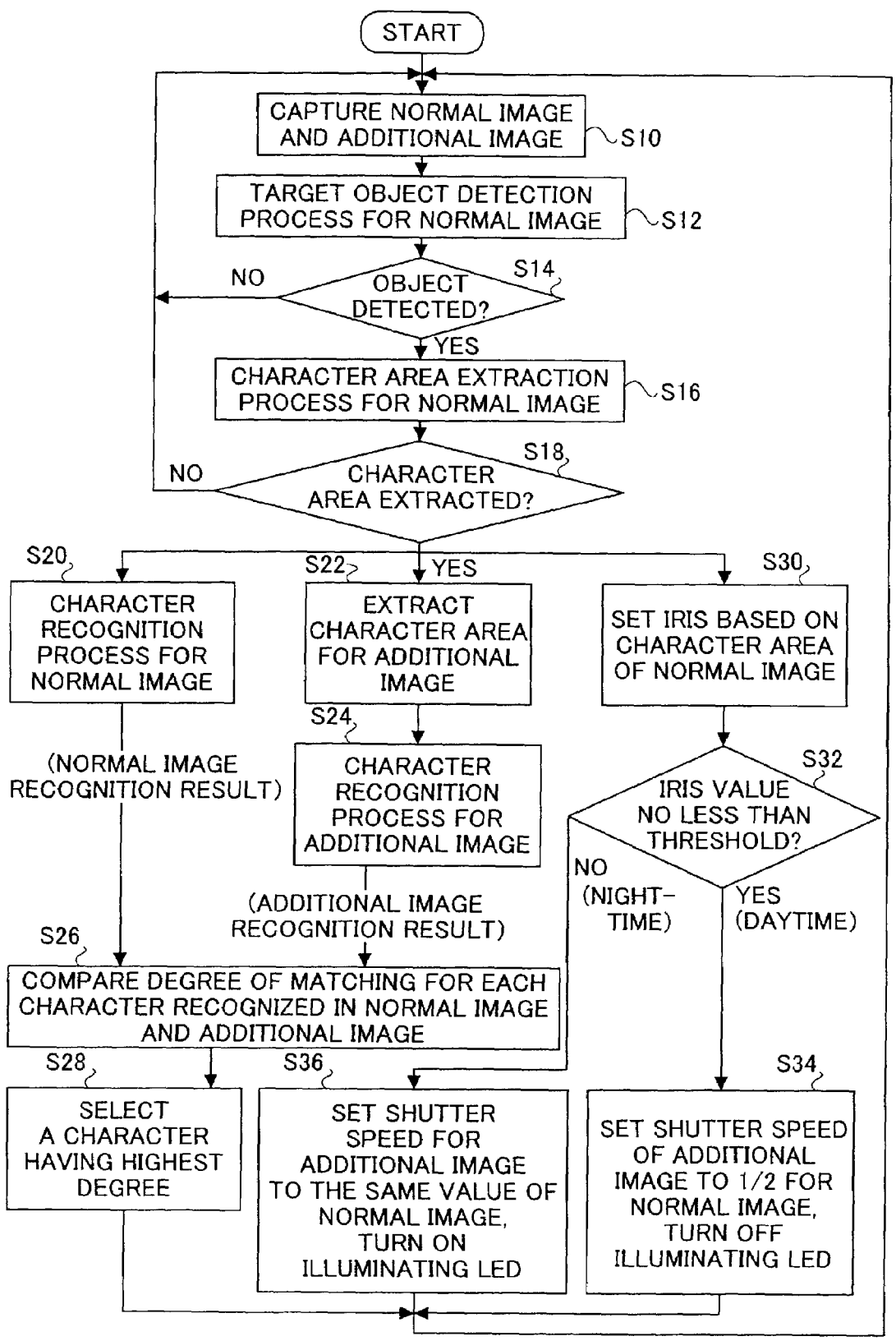
FIG. 4 shows a flowchart showing processes performed by a processor according to the present invention.

FIG. 4 shows a flowchart showing processes performed by the processor 40. As shown in the figure, a normal image (odd field image) and an additional image (even field image) are captured every ⅓₀ second in step 10, and a target object detection process is performed by using the normal image in step 12.

It is determined whether the target object is detected in step 14. When the target object is not detected, the process goes to step 10. When the target object is detected, a process for extracting a character area is performed for the normal image in step 16. Then, it is determined whether the character area is extracted or not in step 18. When the character area is not detected, the process goes back to step 10.

When the character area is extracted from the normal image, the character recognition process is performed in step 20 for the character area by a dictionary matching process, so that recognition result of the normal image is obtained. Concurrently with this character recognition process, a position of the character area in the additional image is determined in step 22, and character recognition process is performed for the character area of the additional image in step 24, so that recognition result of the additional image is obtained. Since the normal image and the additional image are images in a same frame, it is assumed that the position of the character area in the additional image is almost the same as that in the normal image.

As for the recognition results obtained in steps 20 and 24, matching degrees are compared for each character in step 26. And, an image having a higher matching degree is determined as a final recognition result and output in step 28.

In addition, concurrently with steps 20, 22 and 24, the iris of the infrared camera 31 is adjusted such that brightness of the character area extracted from the normal image becomes a proper value in step 30. Steps 30–36 may be performed after the steps 20–28 are performed.

In step 32, it is determined whether the iris setting value is no less than a threshold. When the iris setting value is no less than the threshold, it is determined that it is daytime, so that the illuminating LED 32 is turned off, and shutter speed for the additional image is set to be ½ of that of the normal image (or slower). For example, if shutter speed for the normal image is ¹⁄₁₀₀₀ (sec), shutter speed for the additional image is set to be ¹⁄₅₀₀ (sec).

When the iris setting value is smaller than the threshold, it is determined that it is nighttime, so that the illuminating LED 32 is turned on in step 36 only for the normal image, and shutter speed for the additional image is set to be the same as that of the normal image.

In the above-mentioned control, by setting shutter speed for the additional image to be ½ of that for the normal image in daytime, the additional image becomes brighter than the normal image. In the nighttime, by turning on the illuminating LED 32 (only for the odd field image), the additional image becomes darker than the normal image.

When the image pickup apparatus turns on the illuminating LED 32 for both fields, the same control can be realized by setting the shutter speed for the additional image to be two times (or more) as that of the normal image. Thus, recognition performance in the nighttime can be improved even if the image pickup apparatus does not have the function to adjust shutter speed for each field.

FIG. 5 shows differences of character status between the normal image and the additional image in the daytime. In the daytime, since the additional image is brighter than the normal image, even if a character in the normal image is too dark to recognize properly due to shadows of surrounding objects, the character can be recognized properly in the additional image as shown in FIG. 5.

FIG. 6 shows differences of character status between the normal image and the additional image in the nighttime. In the nighttime, since the additional image is darker than the normal image, even when a character in the normal image is too bright to recognize properly due to light irradiation from surroundings, the character can be recognized properly in the additional image.

In the above-mentioned method of the present invention, even when brightness near the character area is not proper for recognition in the normal image, brightness near the character area becomes proper for recognition in the additional image. Thus, stable character recognition performance can be kept, so that recognition performance improves.

Although the normal image and the additional image are captured as the odd field and the even field in the above-mentioned embodiment, the normal image and the additional image may be captured as different frames.

Figure 7:
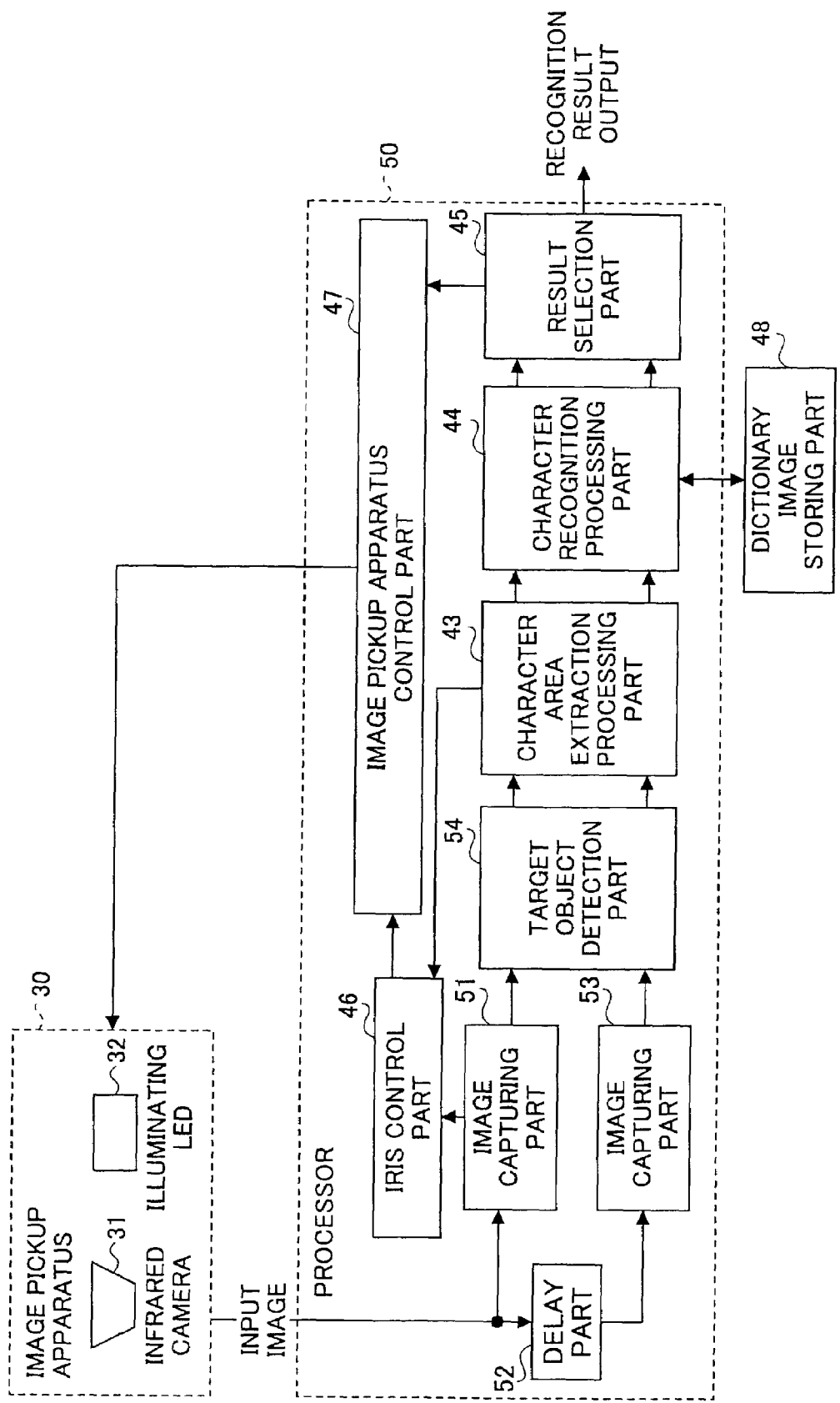
FIG. 7 shows a block diagram of the second embodiment of the character recognition apparatus according to the present invention.

FIG. 7 shows a block diagram of a second embodiment of the character recognition apparatus according to the present invention. In the figure, the same numerals are assigned to the same parts as those in FIG. 3. In FIG. 7, the image pickup apparatus 30 includes an infrared camera 31 which can be used for day and night and the illuminating LED 32. In this embodiment, the illuminating LED 32 is effective for both odd and even fields.

The image taken by the infrared camera 31 is provided to an image capturing part 51 and a delay part 52 in the processor 50. The image capturing part 51 captures each input image from the image pickup apparatus 30 every 1/30 second for each field or for each frame. The image delayed by a delay part 52 for a predetermined time (from several frames to several tens of frames, for example) is provided to an image capturing part 53. The image capturing part 53 captures the delayed input image every 1/30 second for each frame. After that, the image captured by the image capturing part 51 is processed as a present image, and the image captured by the image capturing part 53 is processed as a delayed image.

Each image captured by the image capturing parts 51 and 53 is supplied to a target object detection part 54. The target object detection part 54 determines whether a recognition target object exists in each of the present image and the delayed image. The present image and the delayed image in which the recognition target object is detected are passed to the character area extraction processing part 43, so that a character area (a number plate, for example), which is the recognition target, is extracted from the recognition target object.

A matching process is performed for each character area for the present image and the delayed image, in which each character area is compared with the dictionary images in the dictionary image storing part 48 by the character recognition processing part 44. Then, characters matched with the dictionary image are passed to the result selection part 45. The result selection part 45 selects the character recognition result that has a higher matching degree between the character recognition results of the present image and the delayed image, and outputs the character recognition result.

Normally, focus and shutter speed of the infrared camera 31 in the image pickup apparatus 30 are adjusted and fixed when the image pickup apparatus 30 is set up. The iris control part 46 in the processor 40 controls the iris of the infrared camera 31 via the image pickup apparatus control part 47 such that brightness of the character area extracted from the present image becomes a proper value. In addition, the iris control part 46 determines that it is daytime when the iris setting value is no less than a predetermined threshold and turns off the illuminating LED 32. When the iris setting value is smaller than the threshold, the iris control part 46 determines that it is nighttime and turns on the illuminating LED 32.

Recognition accuracy improves by selecting a recognition result on the basis of the matching degree between recognition results of images having time difference of several frames. In this case, even when a character cannot be recognized in the present image due to an obstacle, the character can be recognized by using the delayed image in which the position of the character is different from that in the present image. Accordingly, the possibility for recognizing a character area increases even when an obstacle hides the character area accidentally, so that character recognition performance further improves.

Figure 8:
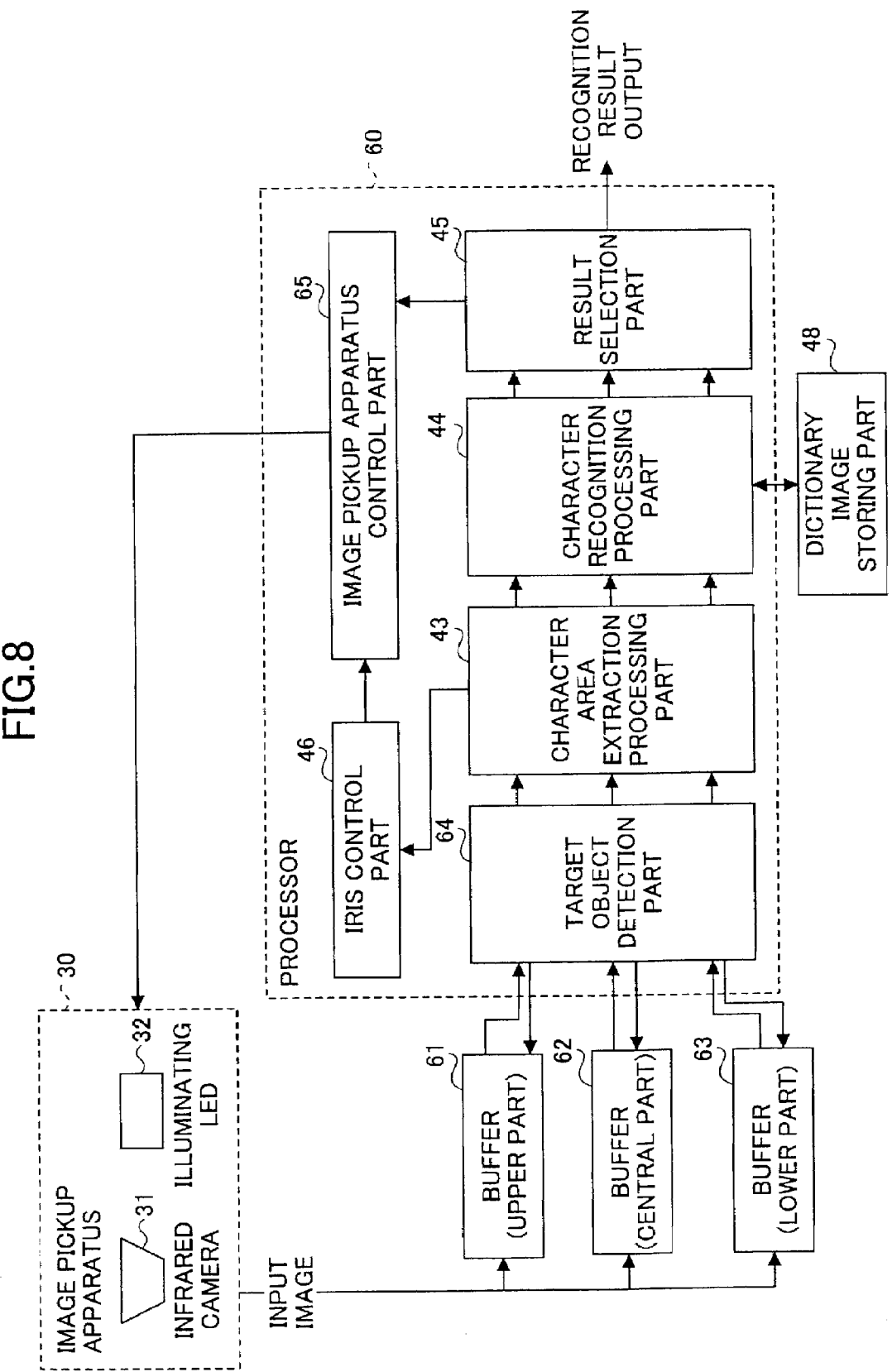
FIG. 8 shows a block diagram of the third embodiment of the character recognition apparatus according to the present invention.

FIG. 8 shows a block diagram of the third embodiment of the character recognition apparatus according to the present invention. In the figure, the same numerals are assigned to the same parts as those in FIG. 3 and FIG. 7. In FIG. 8, the image pickup apparatus 30 includes an infrared camera 31 that can be used day and night and the illuminating LED 32. In this embodiment, the illuminating LED 32 is effective for both odd and even fields.

Input images taken by the infrared camera 31 are captured in a buffer 61 successively by each frame. The image captured by the buffer 61 is supplied to the target object detection part 64. The target object detection part 64 checks whether a recognition target object exists in an upper image, wherein the upper image is one of three images into which the input image is divided vertically, the rest of the three images being a central image and a lower image. When a recognition target object is detected, the target object recognition part 64 passes the image to the character area extraction processing part 43, and the buffer for capturing an input image is changed from the buffer 61 to the buffer 62.

The character area extraction processing part 43 extracts an character area from the recognition target object, the extracted character area is compared with dictionary images in the dictionary image storing part 48 by the character recognition processing part 44. Then, characters that match with dictionary images are passed to the result selection part 45.

The image captured in the buffer 62 is supplied to the target object detection part 64. The target object detection part 64 determines whether a recognition target object exists in the central image. When a recognition target object is detected, the target object recognition part 64 passes the image to the character area extraction processing part 43, and the buffer for capturing the input image is changed from the buffer 62 to the buffer 63.

The character area extraction processing part 43 extracts a character area from the recognition target object, the extracted character object is compared with dictionary image by the characters recognition processing part 44. Then, characters that match with dictionary image are passed to the result selection part 45.

The image captured in the buffer 63 is supplied to the target object detection part 64. The target object detection part 64 checks whether a recognition target object exists in the lower image. When a recognition target object is detected, the target object recognition part 64 passes the image to the character area extraction processing part 43, and the buffer for capturing the input image is changed from the buffer 63 to the buffer 61.

The character area extraction processing part 43 extracts a character area from the recognition target object, the extracted character object is compared with dictionary image by the character recognition processing part 44. Then, characters that match with the dictionary image are passed to the result selection part 45.

The result selection part 45 selects the character recognition result that has the highest matching degree, that is, that matches the dictionary image most accurately among character recognition results of the upper image, the central image and the lower image, and outputs the selected result to the outside, and notifies the image pickup apparatus control part 65 of the result. After that, character recognition for each of the upper image, central image and the lower image is repeated.

Normally, focus and shutter speed of the infrared camera 31 in the image pickup apparatus 30 are adjusted and fixed when the image pickup apparatus 30 is set up. The iris control part 45 in the processor 40 controls the iris of the infrared camera 31 via the image pickup apparatus control part 65 such that brightness of each character area extracted from the upper image, the central image and the lower image becomes a proper value. In addition, the iris control part 46 determines that it is daytime when the iris setting value is no less than a predetermined threshold and the iris control part 46 turns off the illuminating LED 32. When the iris setting value is smaller than a threshold, the iris control part 46 determines that it is nighttime so that the illuminating LED 32 is turned on.

In addition, the image pickup control part 65 performs focus change control to adjust the focus of the infrared camera 31 to farther by a predetermined ratio if the selected image is the upper image, and to adjust the focus to nearer by a predetermined ratio if the selected image is the lower image.

Generally, the upper image includes farther objects than those in the central image, and the lower image includes nearer objects than those in the central image. Therefore, by performing the focus change control, the focus of the infrared camera 31 can be automatically controlled such that the image having the highest degree of matching becomes the central image. Accordingly, even when the focus is not adjusted properly when setting up the image pickup apparatus 30, the focus can be adjusted automatically.

The present invention is applied not only to the system for recognizing numbers of cars entering a parking and managing the cars, but also to various systems such as a system for recognizing numbers of cars entering a toll gate of a highway, and a system for recognizing numbers and destinations of commodities conveyed by a belt conveyor.

As mentioned above, according to the present invention, even when a character is too dark to recognize due to shadows of surrounding objects in the daytime, the character can be recognized by using images having differing brightness. In addition, even when a character is too bright to recognize due to irradiation from surroundings in the nighttime, the character can be recognized by using images having differing brightness.

In addition, according to the present invention, since images having time difference with each other are used for character recognition and the final character recognition result of which the matching degree is the highest is selected from character recognition results of the images, the possibility for recognizing a character area increases even when an obstacle hides the character area accidentally, so that character recognition performance further improves.

Further, according to the present invention, an image in a motion picture is divided into a plurality of regions including an upper region and an lower region for character recognition of each region, a final character recognition result of which the matching degree is the highest is selected from character recognition results of the regions, and focus of an image pickup apparatus is adjusted to focus on farther objects when the final character recognition is for the upper region, and the focus is adjusted to focus on nearer objects when the final character recognition is for the lower region.

Therefore, even when focus of the image pickup apparatus is not adjusted properly at the time of set up, the focus can be automatically adjusted.

The present invention is not limited to the specifically disclosed embodiments, and variations and modifications may be made without departing from the scope of the invention.

What is claimed is:

1. A character recognition method used for extracting a character area from a recognition target object in a motion picture and recognizing a character in said character area, said character recognition method comprising the steps of:
   picking up images in the motion picture by changing brightness for each of the images;
   extracting at least one character area from each image;
   recognizing at least one character in said character area by performing a matching process between said character area and dictionary images for each image, and determining a character recognition result for each image; and
   selecting a final character recognition result of which a matching degree is the highest from the character recognition results of said images.

2. A character recognition method used for extracting a character area from a recognition target object in a motion picture and recognizing a character in said character area, said character recognition method comprising the steps of:
   extracting images having time difference with each other from the motion picture;
   extracting said character area from each image;
   recognizing at least one character in said character area by performing a matching process between said character area and dictionary images for each image, and determining a character recognition result for each image; and
   selecting a final character recognition result of which a matching degree is the highest from the character recognition results of said images.

3. A character recognition method used for extracting a character area from a recognition target object in a motion picture and recognizing a character in said character area, said character recognition method comprising the steps of:
   dividing an image in the motion picture into a plurality of regions including an upper region and a lower region;
   extracting said character area from each region;
   recognizing at least one character in said character area by performing a matching process between said character area and dictionary images for each region, and determining a character recognition result for each region;
   selecting a final character recognition result of which a matching degree is the highest from the character recognition results of said regions; and
   adjusting a focus of an image pickup apparatus to farther objects when said final character recognition is for said upper region, and adjusting said focus to nearer objects when said final character recognition is for said lower region.

4. A character recognition apparatus used for extracting a character area from a recognition target object in a motion picture and recognizing a character in said character area, said character recognition apparatus comprising:
   a part for picking up images in the motion picture by changing brightness for each image;
   a part for extracting said character area from each image;

a part for recognizing at least one character in said character area by performing a matching process between said character area and dictionary images for each image, and determining a character recognition result for each image; and a part for selecting a final character recognition result of which a matching degree is the highest from the character recognition results of said images.

5. The character recognition apparatus as claimed in claim 4, said part for picking up images including a part for changing a shutter speed to change brightness for each image.

6. The character recognition apparatus as claimed in claim 4, said part for picking up images including a part for changing illumination to change brightness for each image.

7. A character recognition apparatus used for extracting a character area from a recognition target object in a motion picture and recognizing a character in said character area, said character recognition apparatus comprising:

a part for extracting images having time difference with each other from the motion picture;

a part far extracting said character area from each image;

a part for recognizing at least one character in said character area by performing a matching process between said character area and dictionary images for each image, and determining a character recognition result for each image; and a part for selecting a final character recognition result of which a matching degree is the highest from the character recognition results of said images.

8. A character recognition apparatus used for extracting a character area from a recognition target object in a motion picture and recognizing a character in said character area, said character recognition apparatus comprising:

a part for dividing an image in the motion picture into a plurality of regions including an upper region and a lower region;

a part for extracting said character area from each region;

a part for recognizing at least one character in said character area by performing a matching process between said character area and dictionary images for each region, and determining a character recognition result for each region;

a part for selecting a final character recognition result of which a matching degree is the highest from the character recognition results of said regions; and a part for adjusting a focus of an image pickup apparatus to farther objects when said final character recognition is for said upper region, and adjusting said focus to nearer objects when said final character recognition is for said lower region.

9. A method of extracting a character area from a recognition target object in a motion picture and recognizing one or more characters in the character area, the method including:

picking up a first image:

changing a brightness and picking up a second image successive to the first image;

performing a character recognition operation on an extracted character area in each of the first and second images; and determining a character recognition result by selecting which of the one or more characters in the first and second image character areas more closely matches one or more reference characters.

* * * * *

UNITED STATES PATENT AND TRADEMARK OFFICE
CERTIFICATE OF CORRECTION

| | |
|---|---|
| PATENT NO. | : 7,103,199 B2 |
| APPLICATION NO. | : 10/271548 |
| DATED | : September 5, 2006 |
| INVENTOR(S) | : Hiroshi Watanabe et al. |

It is certified that error appears in the above-identified patent and that said Letters Patent is hereby corrected as shown below:

Title Page Column 2 (Other Publications), Line 4, change "Regristration" to --Registration--.

Column 9, Line 22, change "far" to --for--.

Column 10, Line 19-32, change "extracting a character area from a recognition target object in a motion picture and recognizing one or more characters in the character area, the method including: picking up a first image: changing a brightness and picking up a second image successive to the first image; performing a character recognition operation on an extracted character area in each of the first and second images; and determining a character recognition result by selecting which of the one or more characters in the first and second image character areas more closely matches" to --recognizing one or more characters in a recognition target object in a motion picture, the method including: picking up a first image; changing a brightness and picking up a second image successive to the first image; comparing one or more corresponding characters in each of the first and second images with one or more reference characters; and recognizing the one or more characters according to which of the compared corresponding characters more closely matches the--.

Signed and Sealed this

Twenty-fourth Day of July, 2007

JON W. DUDAS
*Director of the United States Patent and Trademark Office*